United States Patent [19]

Campbell et al.

[11] 4,419,387

[45] Dec. 6, 1983

[54] BORIC ACID HAVING IMPROVED HANDLING PROPERTIES

[75] Inventors: George W. Campbell, Hesperia; Jerome T. Muench, Lancaster, both of Calif.

[73] Assignee: United States Borax & Chemical Corporation, Los Angeles, Calif.

[21] Appl. No.: 345,267

[22] Filed: Feb. 2, 1982

[51] Int. Cl.$^3$ .............................................. B05D 7/00
[52] U.S. Cl. .................................. 427/215; 427/248.1; 428/403
[58] Field of Search ..................... 427/248.1, 212, 215; 428/403

[56] References Cited

PUBLICATIONS

Lehmann et al., Zeitschrift fur chemie, 5, #3, p. 111, (1965).
Z. Chem., v5, (1965), Bk. 3, p. 111, (an English Translation of "R".

Primary Examiner—Thomas J. Herbert, Jr.
Attorney, Agent, or Firm—James R. Thornton

[57] ABSTRACT

The lubricity of particulate boric acid is reduced by treating the surface of the particles with gaseous ammonia. Fine particles of boric acid treated with a small amount of gaseous ammonia are readily fed to a continuous compactor system.

12 Claims, No Drawings

BORIC ACID HAVING IMPROVED HANDLING PROPERTIES

This invention relates to particulate boric acid having improved physical properties, and especially to finely divided boric acid having improved handling properties.

BACKGROUND OF THE INVENTION

The lubricity of particulate boric acid is well-known and, in fact, this property was used to advantage several years ago by sprinkling large crystals of boric acid on dance floors. However, this lubricity presents problems in handling particulate boric acid, especially fine particles of boric acid such as those of less than about 200 mesh (75 microns) in size. In the manufacture of boric acid, crystals of such fine particle size are generally separated from the product. These fines are unsuitable for most customers due to their dustiness and difficult handling properties such as in conveyance of products as in bins or on moving belts. Therefore, the manufacturer would like to compact these fine particles so as to convert them into a product more acceptable to the market place. However, the difficult handling characteristics of the fine material, due to its lubricity as well as low bulk density, make it extremely difficult to feed into a continuous compactor system.

SUMMARY OF INVENTION

This invention provides a method for substantially reducing the lubricity of particulate boric acid and provides a novel product having improved handling properties. According to this invention, particulate boric acid is treated with a small amount of gaseous ammonia, thereby substantially reducing the lubricity so that it may be readily handled with industrial equipment such as conveyor belts, feed bins and compactor systems. It is postulated that the ammonia molecule is chemically bonded by an acid-base reaction to the surface atoms of the boric acid particle, thereby reducing the lubricity between the boric acid crystals, although the invention is not limited to any particular mechanism or explanation.

DESCRIPTION OF THE INVENTION

The treatment with gaseous ammonia, such as anhydrous ammonia, preferably takes place at about ambient temperatures, although temperatures of from about 0° to about 50° C. may be employed. The treatment consists of merely exposing the surface of the boric acid particles to an atmosphere containing gaseous ammonia, such as an air stream, into which ammonia gas is injected, or an atmosphere of substantially pure gaseous ammonia.

The amount of ammonia fed to the air stream may be adjusted to provide a product having the desired ammonia content, which suitably is in the range of from about 5 to 5000 parts per million ammonia on the boric acid product. Alternatively, an atmosphere of substantially pure gaseous ammonia may be provided, such as by injection into a screw conveyor, pugmill or other equipment in which the boric acid is conveyed, thereby providing good mixing and contact of the boric acid with the ammonia. The boric acid reacts rapidly with the ammonia and the amount of ammonia fed to the system may be readily adjusted so that there is no odor of free ammonia.

A boric acid particle having an ammonia content of from about 25 to 150 parts per million is especially preferred. Such a product has a substantially reduced lubricity, thus providing boric acid with improved handling characteristics. For example, such a product can be readily drawn into the bite of a continuous compactor system, and therefore produce a compactor cake with good physical integrity which can be comminuted to provide a boric acid product with low dusting tendencies and having a particle size distribution which is acceptable to the market place. Such low levels of ammonia in the product have little or no effect on the behavior of the boric acid in most end uses. For example, if the boric acid is used in glass manufacture, the small amount of ammonia on the particle will be quantitatively converted to gaseous nitrogen and water in the glass furnace.

The following examples are presented to illustrate the method and novel product of this invention.

EXAMPLE 1

In a laboratory study, a sample of boric acid dust was divided into two portions of about one kg. each. One sample was placed in a laboratory fluidized bed and dry air was passed through the dust for 10 minutes at a rate to just fluidize the solid boric acid. The second sample was treated in an identical manner except that ammonia gas was injected into the feed air stream at a rate of about one percent of the total air stream. After this treatment the two samples of boric acid were compared. In a large beaker, the sample treated with ammonia showed remarkably different flow characteristics to the sample without ammonia treatment. When the flat part of a spatula was moved through the untreated sample, the boric acid dust flowed around the spatula in a manner resembling a fluid, whereas the treated sample did not flow readily, but moved ahead of the spatula and tended to clump when compressed between the spatula and the beaker wall.

EXAMPLE 2

Boric acid fines, collected in a dust collector and containing 60 to 70 percent −200 mesh (75 microns) solid boric acid, was fed to the force feeder cone of a Komareck-Greaves compactor (10 inches diameter, 5.5 inches wide, corrugated rolls) under hydraulic pressure of 1,500 lbs. The force feeder was ineffective in this system and the boric acid could not be put through the compactor. Ammonia gas was then injected at the base of the force feeder cone at a rate sufficient to provide 150–170 ppm. $NH_3$ to the boric acid. The physical properties of the boric acid in the force feeder changed dramatically and the boric acid began to move through the compactor, yielding a product of good physical integrity.

EXAMPLE 3

Boric acid fines were fed continuously to the force feeder of a Komareck-Greaves compactor and ammonia gas was injected at the force feeder. The boric acid passed through the compactor giving a cake with good physical integrity. This compacted cake was analyzed by ion chromotography and found to contain 61 ppm. ammonia.

EXAMPLE 4

Dust collector fines from boric acid manufacture were compacted continuously in a Komareck-Greaves compactor with ammonia added at the force feeder. The recycle of fines passing the compactor and passing through a 12 mesh screen was approximately 30 percent of the compactor discharge. The compacted cake contained 79 ppm. ammonia, analyzed by ion chromotography.

EXAMPLE 5

In a large scale study, using a smooth roll compactor without a force feeder, boric acid dust was fed through a pugmill, dropping the dust through a conical hopper, which in turn fed the compactor rolls. The rolls were 18 inches in diameter by 18 inches wide. Initially the boric acid dust would not move through the pugmill satisfactorily, and it would not pass the compactor rolls at all. Anhydrous ammonia gas was then fed into the pugmill, resulting in immediate response and good discharge from the pugmill. At first the product passed the compactor rolls only with difficulty. The ammonia addition was increased and the boric acid dust began to move through the compactor at a very satisfactory rate. Ammonia concentrations were measured in the product cake, as the ammonia concentration was increased. These $NH_3$ concentrations were found to be 0.11, 0.11, 0.16, 0.17, 0.22, 0.23, 0.28, and 0.54 percent, respectively. In each case the product was well compacted with good physical integrity.

Various changes and modifications of the invention can be made, and to the extent that such variations incorporate the spirit of this invention, they are intended to be included within the scope of the appended claims.

What is claimed is:

1. The method of decreasing the lubricity of particulate boric acid which comprises contacting said particulate boric acid with an effective amount of gaseous ammonia at a temperature of about 0° to about 50° C., thereby providing boric acid particles of reduced lubricity having about 5 to 5000 ppm. ammonia chemically bonded to the surface thereof.

2. The method according to claim 1 in which the treatment is at ambient temperature.

3. The method according to claim 1 in which said particulate boric acid has a particle size predominantly smaller than about 75 microns.

4. The method according to claim 1 in which said particulate boric acid is treated with anhydrous ammonia.

5. The method according to claim 1 in which said particulate boric acid is treated with air containing gaseous ammonia.

6. The method according to claim 1 in which said boric acid particles of reduced lubricity are compacted to provide a cake which can be comminuted to provide product of larger particle size.

7. The method according to claim 6 in which said boric acid particles have about 25 to 150 ppm. of $NH_3$.

8. The method according to claim 6 in which said temperature is about ambient temperature.

9. The method according to claim 6 in which gaseous ammonia is injected at the base of a force feeder to a compactor.

10. The method according to claim 1 in which said particulate boric acid is contacted with gaseous ammonia in an amount to provide about 25 to 150 ppm. of $NH_3$ on said particles.

11. The method according to claim 10 in which said particulate boric acid has a particle size predominantly smaller than 75 microns.

12. The method according to claim 11 in which said boric acid particles of reduced lubricity are compacted to provide a cake which can be comminuted to provide product of larger particle size.

* * * * *